United States Patent [19]

Kolaska et al.

[11] Patent Number: 5,413,855
[45] Date of Patent: May 9, 1995

[54] SHAPED BODIES OF GRANULATED BEADS AND METHOD

[75] Inventors: Karl-Heinz Kolaska, Löwenstein; Gerd Voss, Metzingen, both of Germany

[73] Assignee: Storopack Hans Reichenecker GmbH & Co., Weinstadt, Germany

[21] Appl. No.: 141,654

[22] Filed: Oct. 26, 1993

[30] Foreign Application Priority Data

Oct. 30, 1992 [DE] Germany ............... 42 36 717.4

[51] Int. Cl.⁶ .............................................. B32B 3/26
[52] U.S. Cl. ............................ 428/320.2; 428/402; 428/403; 428/407; 428/522; 428/532; 428/913
[58] Field of Search ............... 524/31; 427/195, 222; 428/403, 405, 407, 402, 522, 532, 913, 320.2; 264/53; 523/202, 208

[56] References Cited

U.S. PATENT DOCUMENTS

| | | | |
|---|---|---|---|
| 2,941,964 | 6/1960 | Houston et al. | 521/79 |
| 2,941,965 | 6/1960 | Ingram | 521/79 |
| 3,066,382 | 12/1962 | Zweigle | 428/369 |
| 3,251,728 | 5/1966 | Humbert et al. | 560/75 |
| 3,961,000 | 6/1976 | Ropiequet | 264/45.5 |
| 4,500,586 | 2/1985 | Bussey, Jr. | 428/174 |
| 4,599,269 | 7/1986 | Kohaut et al. | 428/397 |
| 4,627,947 | 12/1986 | Voss | 264/53 |
| 4,863,655 | 9/1989 | Lacourse et al. | 264/53 |
| 4,880,870 | 11/1989 | Zimmermann et al. | 524/31 |
| 5,000,891 | 3/1991 | Green | 264/45.5 |
| 5,035,930 | 7/1991 | Lacourse et al. | 428/35.6 |
| 5,043,196 | 8/1991 | Lacourse et al. | 428/35.6 |
| 5,153,037 | 10/1992 | Altieri | 428/35.6 |
| 5,186,990 | 2/1993 | Starcevich | 428/35.6 |

FOREIGN PATENT DOCUMENTS

| | | |
|---|---|---|
| 0087847 | 9/1983 | European Pat. Off. . |
| 0118240 | 9/1984 | European Pat. Off. . |
| 0376201 | 7/1990 | European Pat. Off. . |
| 0437961 | 7/1991 | European Pat. Off. . |
| 0474095 | 3/1992 | European Pat. Off. . |
| 0507554 | 10/1992 | European Pat. Off. . |
| 3712029 | 5/1986 | Germany . |

Primary Examiner—Patrick J. Ryan
Assistant Examiner—William A. Krynski
Attorney, Agent, or Firm—Jones, Tullar & Cooper

[57] ABSTRACT

A shaped body made from a plurality of granulate beads of biodegradable material. The beads are subjected to either hot air or steam having relative residual moisture content of 0.5 to 2%. As a result, the beads have at least a part of their surface dissolved forming an adhesive surface. Adjacent adhesive surfaces are then bonded to each other to form the shaped body.

6 Claims, 1 Drawing Sheet

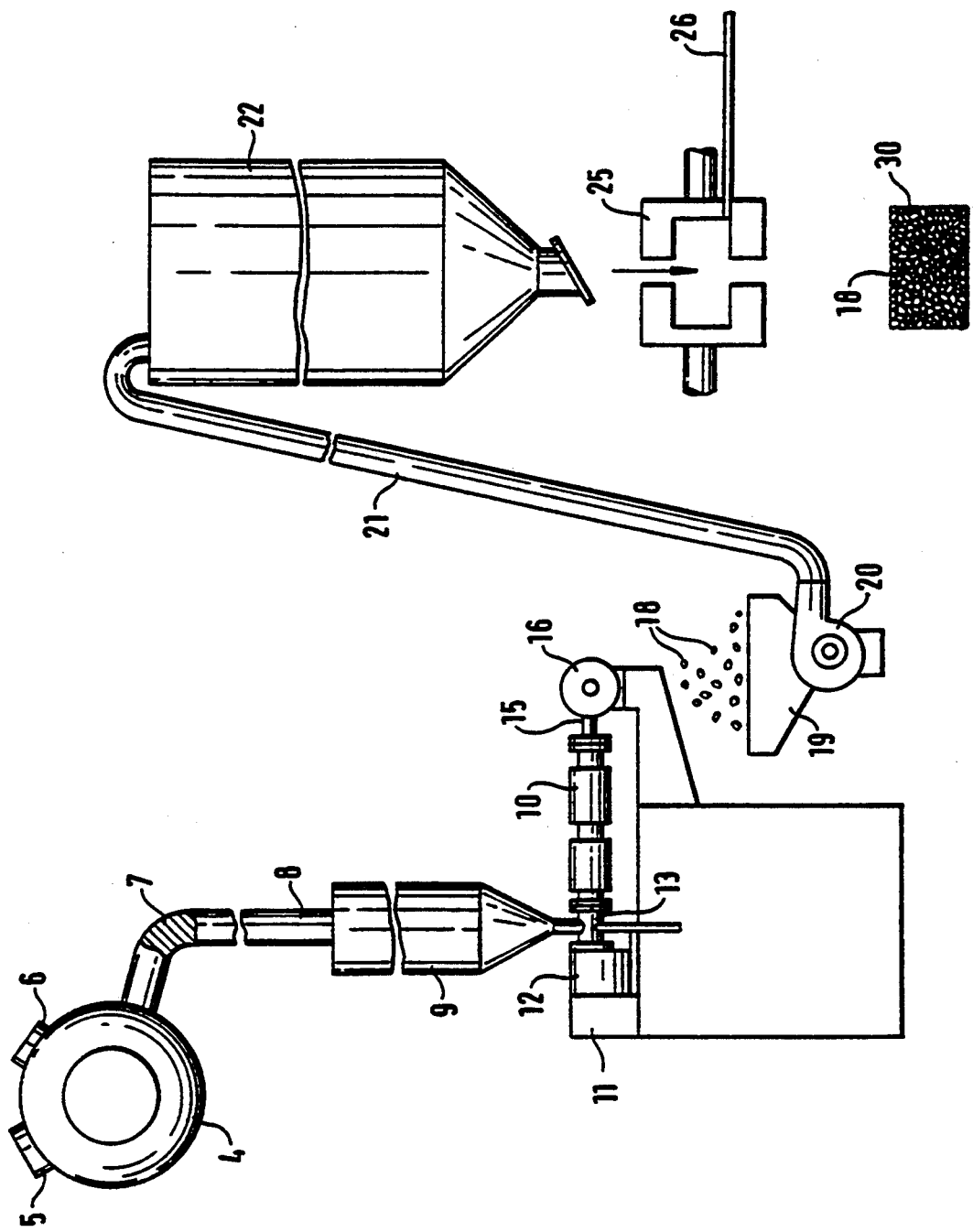

SHAPED BODIES OF GRANULATED BEADS AND METHOD

FIELD OF THE INVENTION

The present invention relates to shaped bodies made of expanded granulate beads at least partially joined together under pressure in a closed mold, and to a method of producing the shaped bodies.

CROSS REFERENCE TO RELATED APPLICATIONS

The subject matter of this application is related to the subject matter of applications, Ser. No. 07/949,252 and Ser. No. 07/615,170, both assigned to the assignee of the present application.

BACKGROUND OF THE INVENTION

Shaped bodies of this kind made of expandable polystyrene (EPS), which are fused together, are known (German Published, Non-Examined Patent Application DE-OS 37 22 539). On their inside, such shaped bodies replicate the outer contour of the item to be packed in them and can thus be placed all around this article. Their outside is smooth and is dimensioned such that together with the article to be packed they fit into a cardboard box or container.

However, the use of plastic is a major disadvantage. Because of their adaptation to the contours of the article to be packed, the shaped bodies are generally used only once. Plastic is difficult to reprocess. This means that the shaped bodies become trash and must be disposed of at some effort and expense.

OBJECT AND SUMMARY OF THE INVENTION

It is therefore an object of the present invention to furnish shaped bodies of the type described at the outset that have comparable mechanical properties yet are simple to manufacture and can be disposed of in an environmentally acceptable way.

This object is attained in that the granulate beads are "adhesively bonded" together and are made of biodegradable material. In a preferred embodiment of the present invention, the biodegradable material is essentially starch. A mixture of starch, polyvinyl alcohol and water is especially suitable. Polyvinyl alcohol, like starch, is water-soluble and biodegradable. A shaped body of this kind has the property of the granulate beads used, and is accordingly biodegradable; for instance if the aforementioned starting materials are used, the shaped body is water-soluble and hence can be broken down by microorganisms. Nevertheless, it has a mechanical load-bearing capacity that is comparable to the conventional shaped bodies made of plastic, and has the advantages attendant thereto.

The fact that shaped bodies of pre-expanded granulate beads of biodegradable material can be manufactured is surprising to one skilled in the art, because it could not have been expected that the granulate beads of biodegradable material, such as starch, could be joined together as stably as is necessary for shaped bodies. Secondly, granulate beads of biodegradable material, such as starch, cannot be fused together by heat, using hot steam, as can granulate beads of EPS. Since, moreover, the heat treatment of EPS shaped bodies is carried out with hot steam (see German Published, Non-Examined Patent Application DE-OS 34 22 425, for instance), on the one hand, and on the other biodegradable material such as starch is rapidly dissolved or suspended by means of water or water vapor, one would not expect that it would be possible to adopt the method used for plastic shaped bodies for starch shaped bodies, and a simple modification did not appear promising.

In the manufacture of the shaped bodies according to the present invention, a different principle is utilized. The heat treatment in the mold is done with only very slight relative humidity. Hot air that at most has a slight relative residual humidity of less than 5% is used. The absolute humidity ($g/m^3$ of air), or the mixture ratio (g/kg of air) covered by this limit value are dependent on temperature and pressure. At 110° C. and 3 bar, a maximum of 20 g of water vapor per 1 kg of air results.

Instead of hot air, very dry steam may also be used, or in other words steam whose density is correspondingly far below the saturation range.

Supplying slight residual moisture in hot air or dry steam to a mold filled with granulate beads substantially comprising starch means that the surface of the granulate beads readily begin to dissolve, without the granulate beads themselves breaking down or dissolving. Only the surfaces begin to dissolve and become sticky, so that they are joined to one another.

BRIEF DESCRIPTION OF THE DRAWING

The figure illustrates an apparatus for producing shaped bodies of granulated beads according to the present invention.

DETAILED DESCRIPTION OF THE PREFERRED EMBODIMENT

An exemplary embodiment of the present invention is described below in conjunction with the accompanying drawing.

Granules (hereinafter starch granules) that comprise 67% starch, 13 to 14% polyvinyl alcohol and 17 to 18% water are used as the starting material.

The apparatus schematically shown has a drum 4, which is charged via openings 5 and 6 with starch granules and from 0.1 to 0.2 weight % of a finely ground nucleating agent (particle size $\leq 40$ μm), and optionally further additives such as pigments and adjuvants. After the additives have been applied to the surface of the starch granules as a result of drum rotation, these granules move along with the dust-fine additives sticking to them through a feed device 7 and a feed line 8 into a fill hopper 9 and from there into an extruder 10. The extruder 10 has, among other elements, a drive motor 11, a transmission 12, and a material infeed zone 13. A mold opening 15 of the extruder 10 is followed by a cutting device 16. The starch granules are delivered to the extruder 10 via the material infeed zone 13, in a manner known per se, and are converted at from 110° to 200° C. into a viscous composition; the worm located in the extruder 10 provides for uniform, thorough mixing. The composition emerges from the mold opening 15, expands, and is converted by the cutting device 16 into granulate beads 18, which are caught in a collecting container 19. These expanded granulate beads 18, which have bubbles in their interior that do not contain expandable gas but merely compressed air, can be stored and further processed as needed.

If they are immediately reprocessed to make shaped bodies 30, the granulate beads 18, comprising starch, polyvinyl alcohol and water, are carried by means of a blower 20 and a collecting line 21 into a reservoir 22. From there, they reach a closable mold 25. The mold has the desired contour of the shaped body to be formed. The mold 25 has a delivery line 26 for steam or hot air. The expanded granulate beads 18 are enclosed in this mold 25. Then delivery of steam or hot air is effected (preferably at 100° to 130° C.) through the line 26. The residual moisture in the steam or hot air, which amounts to a maximum of 5%, begins to slightly dissolve the surface of the granulate beads and thus makes them sticky. The granulate beads accordingly stick together along their surface parts that are adjacent to one another.

The finished shaped bodies have a mechanical strength and restoring capacity that is comparable to known plastic bodies, and are biodegradable.

Controlling the moisture in manufacture is important, since if the moisture is too great not only does the surface become sticky, but the granulate beads will decompose. This depends individually on the pressure, temperature, and volume of the shaped body and must be adapted accordingly. A residual moisture of 0.5 to 2% at 105° to 120° C. and at 1 to 4 bar has proved to be advantageous.

What is claimed is:

1. A shaped body of expanded granulate beads partially joined to one another, comprising:
    a plurality of granulate beads of biodegradable material, said beads having surface parts such that adjacent ones of said surface parts are adhesively bonded together where joined.
2. The shaped body as defined in claim 1, wherein the biodegradable material includes starch.
3. The shaped body as defined in claim 1, wherein the biodegradable material includes starch, polyvinyl alcohol and water.
4. The shaped body as defined in claim 1, wherein the biodegradable material includes 67% starch, 13 to 14% polyvinyl alcohol and 17 to 18% water.
5. The shaped body as defined in claim 1, wherein the granulate beads have bubbles in their interior which contain compressed air.
6. The shaped body as defined in claim 1, wherein the relative residual moisture content imparted to the plurality of granulate beads comprises 0.5 to 2%.

* * * * *